United States Patent [19]
Hsiue et al.

[11] Patent Number: 5,486,311
[45] Date of Patent: Jan. 23, 1996

[54] OPTICALLY ERASABLE READ-AND-WRITE LIQUID CRYSTAL/SIDE-CHAIN LIQUID CRYSTALLINE POLYMER COMPOSITION AND METHOD OF MAKING RECORDATION ON THE SAME

[75] Inventors: Ging-Ho Hsiue; Jow-Tsong Shy, both of Hsinchu; Jang-Jeng Liang; Wen-Chang Chiang, both of Taoyuan, all of Taiwan

[73] Assignee: National Science Council, Taipei, Taiwan

[21] Appl. No.: 121,768

[22] Filed: Sep. 15, 1993

[51] Int. Cl.$^6$ .................... C09K 19/12; C09K 19/20
[52] U.S. Cl. .................. 252/299.66; 252/299.01; 252/299.67
[58] Field of Search .............. 252/299.01, 299.66, 252/299.67; 359/45

[56] References Cited

U.S. PATENT DOCUMENTS 4,904,066  2/1990  Gray et al. .................... 350/350 S

FOREIGN PATENT DOCUMENTS 63-144433  6/1988  Japan .
1-144491  6/1989  Japan .

OTHER PUBLICATIONS

Makromol. Chem., Rapid Commun. 1, 31–34 (1980) "Investigations of Liquid Crystalline Polysiloxanes, 1. Synthesis and Characterization of Linear Polymers".
CA:118: 112826.

Primary Examiner—Shean Wu
Attorney, Agent, or Firm—W. Wayne Liauh

[57] ABSTRACT

An optically erasable read-and-write liquid crystal/side-chain liquid crystalline polymer composition, and method of making recordation on the same, are disclosed. The liquid crystal/side-chain liquid crystalline polymer composition of the present invention comprises: (1) from 45% to 85% of a nematic type ester-based liquid crystal and (2) from 15% to 55% of side-chain polymethylsiloxane liquid crystalline polymer having a molecular weight between about 4,000 to 10,000. The side-chain polymethylsiloxane polymer is prepared by graft-polymerization of a biphenyl derivative having a terminal saturated or unsaturated alkyl group, which can be either symmetrical or asymmetrical, with a polymethylsiloxane to form the liquid crystal side-chain polymethylsiloxane polymer of the present invention. Data are recordable on the recording medium of the present invention using a laser beam heating, and are erasable by applying an external electrical field.

17 Claims, 4 Drawing Sheets

OPTICALLY ERASABLE READ-AND-WRITE LIQUID CRYSTAL/SIDE-CHAIN LIQUID CRYSTALLINE POLYMER COMPOSITION AND METHOD OF MAKING RECORDATION ON THE SAME

FIELD OF THE INVENTION

This invention relates to an optically recordable medium comprising a liquid crystal and side-chain liquid crystalline polymer compound. More particularly, this invention relates to an optically erasable read-and-write liquid crystal/side-chain liquid crystalline polymer composition and method of making recordations on the same.

BACKGROUND OF THE INVENTION

Typically, an optical storage element is defined as those which use optical and electrical means to read or write signals stored or to be stored therein. Currently available optical storage elements include audio cassette recorders (and tapes), video cassette recorders (and tapes), albums, optical discs, cameras, films, etc. The audio recording medium has been improved from the conventional plastic albums to magnetic tapes and compact disks.

Essentially all the commercially available compact disks (CD) or laser discs (LD) are read-only or write-only. Once the data is stored therein, it is impossible to do compilation, erasal, or modification thereof. This is a very inconvenient and uneconomical way to store data. However, because of the fundamental shortcomings of the current optical recording medium, unless new recording media are developed, the situation will continue.

Currently, research efforts in the optical recording industry are focusing on the development of new materials to optically store information therein. For instance, V. P. Shibaev, et al. disclosed a liquid crystalline polymer in "Thermo Recording on Liquid-Crystalline Polymers with Aid of a Laser Beam", Polym. Commun., 1983, Vol. 24, December, pp. 364–365., as well as in a serial of research papers published subsequently. Dubois, J.-C., G. Decobert, P. Le Barny Thomson, and D. de Corbeville disclosed liquid crystalline side chain polymers in "Liquid Crystalline Side Chain Polymers Derived from Polyacrylate, Polymethyacrylate and Poly-α-Chloroacrylat", Mol. Cryst. Liq. Cryst., 1986, Vol. 137, pp. 349–364. All those research publications show that some crystal liquids can exhibit various liquid crystal phases through the external application of an electric field. Most importantly, they demonstrated that these changes are reversible. These discoveries, however, still require the development of special liquid crystal material in order to provide optical memory capability for use in storing data.

Conventionally, liquid crystal polymers are synthesized based on liquid crystal monomers having chiral benzene ring or chiral biphenyl ring, graft-polymerized with optically active polymethylsiloxane compound to form side-chain liquid crystalline polymer having a molecular weight less than about 10,000. The side-chain liquid crystalline polymers often exhibit the properties of spontaneous polarization (PS), electro-optical responsiveness and optically bistable states.

A liquid crystal composition can be used in an optical data storage device because of the electro-optical responsiveness property thereof. The molecular arrangement in a liquid crystal compound generally can be classified into two types—the nematic type and the smectic type. Different types of liquid crystal compounds exhibit different electro-optical effect. The nematic type of liquid crystal has been widely used in optical-electrical storage device. The smectic type of liquid crystal has been used in a ferroelectric liquid crystal devices (FLCD). The latter type of liquid crystal has not been widely used because of the lack of technology to control the thickness of the liquid crystal material as well as the stability of alignment, etc. thereof. The smectic type of liquid crystal has been reported to exhibit excellent optical data storage capabilities in several publications, e.g., Finkelmann, H., D. Naegele and H. Ringsdorf, "Orientation of Nematic Liquid Crystalline Polymers in the Electric Field", Makromol. Chem. 180, 1979, pp. 803–806; Kaempf, G., B. Ag, H. Loewer and M. W. Witman, "Polymers as Substrates and Media for Data Storage", Polym. Eng. and Sci., October, 1987, Vol. 27, No. 19, pp. 1421–1435; McArdle, C. B., M. G. Clark, C. M. Haws, M. C. K. Wiltshire, A. Parker, G. Nestor, G. W. Gray, D. Lacey and K. J. Toyne, "Laser Addressed Thermo-Optic Effect in a Novel Dyed Liquid-Crystalline Polysiloxane", Liquid Crystal, 1987, Vol. 2, No. 5, pp. 573–584. However they only can be used in electro-optical devices since their structural optical scattering center will be shifted when the external electrical field or the surrounding temperature, etc. changes. This causes the stored data to be damaged during the realigned of the molecular structure. Most of application cannot allow the presence of such unstability. That is a principle reason why there has not been a practical application yet.

In 1988, Koide, N., K. Uehara and K. Iimura published an article entitled: "Synthesis and Thermal Properties of Side-Chain Type Liquid Crystalline Polymers with Chiral Unit in the Flexible Moiety", Mol. Cryst. Liq. Cryst., 1988, Vol. 157, pp. 151–162. In that article it is disclosed that the storage stability in ferroelectric liquid crystal can be enhanced by applying a laser beam on such a material to store data therein, then converting its molecular alignment into a special structure by "freezing the material" at a temperature above the glass transition temperature of the main chain thereof. However this article never teaches or suggests whether or how it is possible to erase or modify the data store therein.

SUMMARY OF THE INVENTION

The primary object of the present invention is to develop an optically recordable medium comprising a liquid crystal and side-chain liquid crystalline polymer compound. More particularly, the primary object of the present invention is to develop an optically erasable read-and-write liquid crystal/side-chain liquid crystalline polymer composition and method of making recordation on the same.

The liquid crystal/side-chain liquid crystalline polymer composition disclosed in the present invention comprises (1) from 45% to 85% of a nematic type ester-based liquid crystal and (2) from 15% to 55% of side-chain polymethylsiloxane liquid crystalline polymer having a molecular weight between about 4,000 to 10,000.

The liquid crystalline polymethylsiloxane polymer disclosed in the present invention exhibits spontaneous polarization at about 95° C. The maximal value of spontaneous polarization is 100 nc/cm. At 84° C., liquid crystalline polymethylsiloxane polymer disclosed in the present invention exhibits an electro-optic responsive times are 15 ms and 40 ms, during uprising and decaying, respectively. The optical element prepared from the composition disclosed in the present invention can be used as an optical recording medium.

Another object of the present invention is to provide a method by which information can be recorded using the composition disclosed in the present invention. In the method disclosed herein, a laser beam is used to write data (optical signals) onto a thin film comprised of a nematic type of liquid crystal ester and a side-chain liquid crystalline polymethylsiloxane polymer. Thereafter, an external electrical field is applied thereon to erase the previously stored optical signal.

DETAILED DESCRIPTION OF THE PREFERRED EMBODIMENTS

Figure 1:
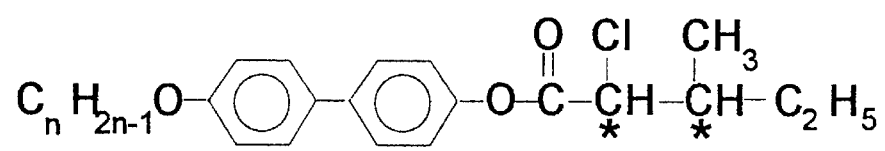
FIG. 1. is the molecular structure of a biphenyl derivative of the present invention which contains a chiral terminal alkyl group.

The present invention discloses an optically erasable read-and-write liquid crystal/side-chain liquid crystalline polymer composition and method of making recordation on the same.

The liquid crystal/side-chain liquid crystalline polymer composition disclosed in the present invention comprises (1) from 45% to 85% of a nematic type ester-based liquid crystal and (2) from 15% to 55% of side-chain polymethylsiloxane liquid crystalline polymer having a molecular weight between about 4,000 to 10,000.

In the present invention, the side-chain polymethylsiloxane polymer is prepared from a biphenyl derivative having a terminal saturated or unsaturated alkyl group, which can be either symmetrical or asymmetrical. The biphenyl compound is graft-polymerized with a polymethylsiloxane to form the liquid crystal side-chain polymethylsiloxane polymer of the present invention. The molecular weight of the polymer is determined by chain length of the biphenyl compound and the saturation thereof. In general, the n value (the carbon number of the alkyl group) could be as large as 30 and the m value (the number of the SiO groups) could be as large as 120, thus the molecular weight of the polymer could lie between 1,000 to 12,000. In order to provide a desirable structure so as to improve its stability with regard to environmental changes, the preferred polymer should have an n value lower than 18 and an m value lower than 100. And the liquid crystal monomer should exhibit a chiral smectic type C liquid crystal phase. Therefore, the preferred molecular weight of the polymer of the present invention should be about 4,000 and 10,000. The glass transition temperature (Tg) of polymer should be between −10° C. and 80° C. Furthermore, the liquid crystal polymer should exhibit a nematic type liquid crystal phase or a nematic-smectic liquid crystal phase at surrounding temperatures between 20° C. and 160° C. The liquid crystal polymer also exhibits spontaneous polarization, electro-optical responsiveness, and optical memory capability, and thus can be commercially used as a data storage element.

One of the advantages of the present invention is that nematic type ester-based liquid crystals are available commercially and can be readily obtained from a number of well-known vendors such as E. Merck. Many nematic type ester-based liquid crystals obtained commercially exhibit nematic and/or smectic liquid crystal phase at a surrounding temperature between 50° C. and 90° C. To prepare the optically recordable medium of the present invention, the side-chain polymethylsiloxane polymer can be blended with the nematic type ester-based liquid crystal using well-known technologies. The side-chain polymethylsiloxane polymer and the nematic type ester-based liquid crystal constitute 45 wt%–85 wt% and 15 wt%–55 wt%, respectively of the final composition.

The liquid crystal phase of the liquid crystalline polymers can be modified with changes in the optical energy change of the surrounding environment, electrical field, magnetic field, or temperature, thus enabling the liquid crystal polymer to possess the optical memory storage capability, which can be utilized to store data. It is well-known that in many commercially available audio and video equipment, the recording element utilize the read-only and write-only capabilities of their memory element to provide the data storage function. In the present invention, a mixture containing a side-chain polymethylsiloxane polymer and a nematic type ester-based liquid crystal is prepared which can be heat treated using laser beams, coupled with the treatment using an externally applied electric field so as to enable a reversible conversion of a film made therefrom to switch between two stable states: a randomly distributed state and a transparent state. After such treatment, the liquid crystal composition can be repeatedly used to reversibly switch between these two stable states.

Figure 2:
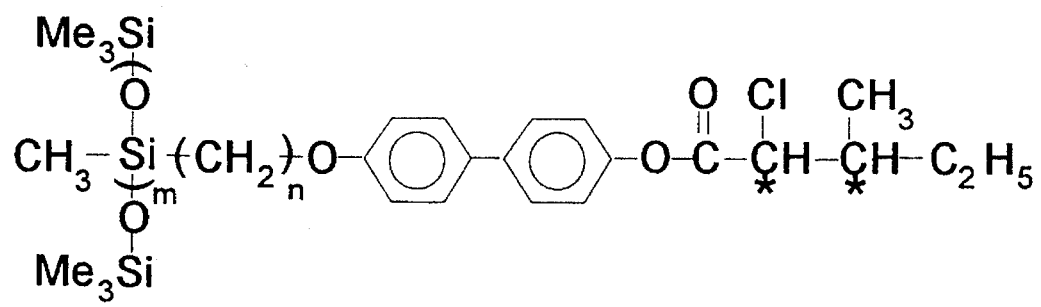
FIG. 2 is the molecular structure of a side-chain polymethylsiloxane liquid crystalline polymer of the present invention.

The side-chain liquid crystalline polymethylsiloxane polymer in the composition of the present invention contains biphenyl derivatives as starting monomers. The bi-phenyl derivative contains a terminal alkyl group. Preferably, the starting monomers contain biphenyl derivatives having a terminal chiral alkyl group. Also preferably, the carbon number (n) of the alkyl group should be less than 30. More preferably, the value of n should be between 6 and 11. Preferably, the number of the SiO groups (m) in the polymethylsiloxane polymer should be below 120. More preferably, the value of m should be between 40 and 100. In a preferred embodiment of the present invention, the side-chain liquid crystalline polymethylsiloxane polymer of the present invention is prepared from the graft polymerization of a biphenyl based monomer having a terminal chiral alkyl group, as shown in FIG. 1, with a polymethylsiloxane. The molecular structure of the final product, which is poly-4'-(3S, 2S')-3-methyl-2-chlorovaleroxy-biphenyl-4-(7-oxyoctylmethyl-siloxane), hereafter compound A, is shown in FIG. 2. The glass transition temperature of the liquid crystalline polymethylsiloxane polymer of compound A is between −10° C. and 50° C.; the polymer will exhibit nematic or smectic liquid crystalline phase at temperatures between 30° C. and 140 ° C. The polymer shows a maximum spontaneous polarization (PS) of 100 nC/cm at 95° C. At 84° C., the electro-optical response times are 15 ms in ascending and 40 ms in decaying. The liquid crystalline material in the compound was E. Merck ZLI 2140, which exhibited nematic and/or smectic liquid crystalline phases at temperatures between 50° C. and 90° C. It is preferred that the liquid crystalline material exhibit nematic liquid crystalline phase at temperatures between 60° C. and 75° C.

The scope of the present invention also includes the method of heat treatment using laser beams followed by an externally applied electrical field that will cause the liquid crystalline composition of the present invention to change between the two stable states: a light-scattering state and a transparent, or any other methods that can perform the same task. By selecting the most suitable composition comprising a nematic ester type liquid crystal and a side-chain polymethylsiloxane polymer, a data recording method is obtained which uses a laser beam to write optical signals onto the composition of the present invention, which is provided in the form of a thin film. Thereafter, the data stored thereon can be erased by applying an external electrical field on the same medium.

In a preferred embodiment of the present invention the laser beam recording method uses an argon (YAG) laser gun having an output power of 5 mw/J, and an external electrical field at 50 to 200 volt AC electric power and a frequency of between 5 and 60 Hz. When the power is turned on, the laser beam frequency stays at between 470 nm and 530 nm. The method of data recordation of the present invention is affected by the thickness of the thin film. Preferably, the recording medium has a thickness between 6 μm and 12.5 μm. The recording temperature should maintain between 20° C. and 125° C., within which range the nematic liquid crystalline phase can be observed.

Figure 3:
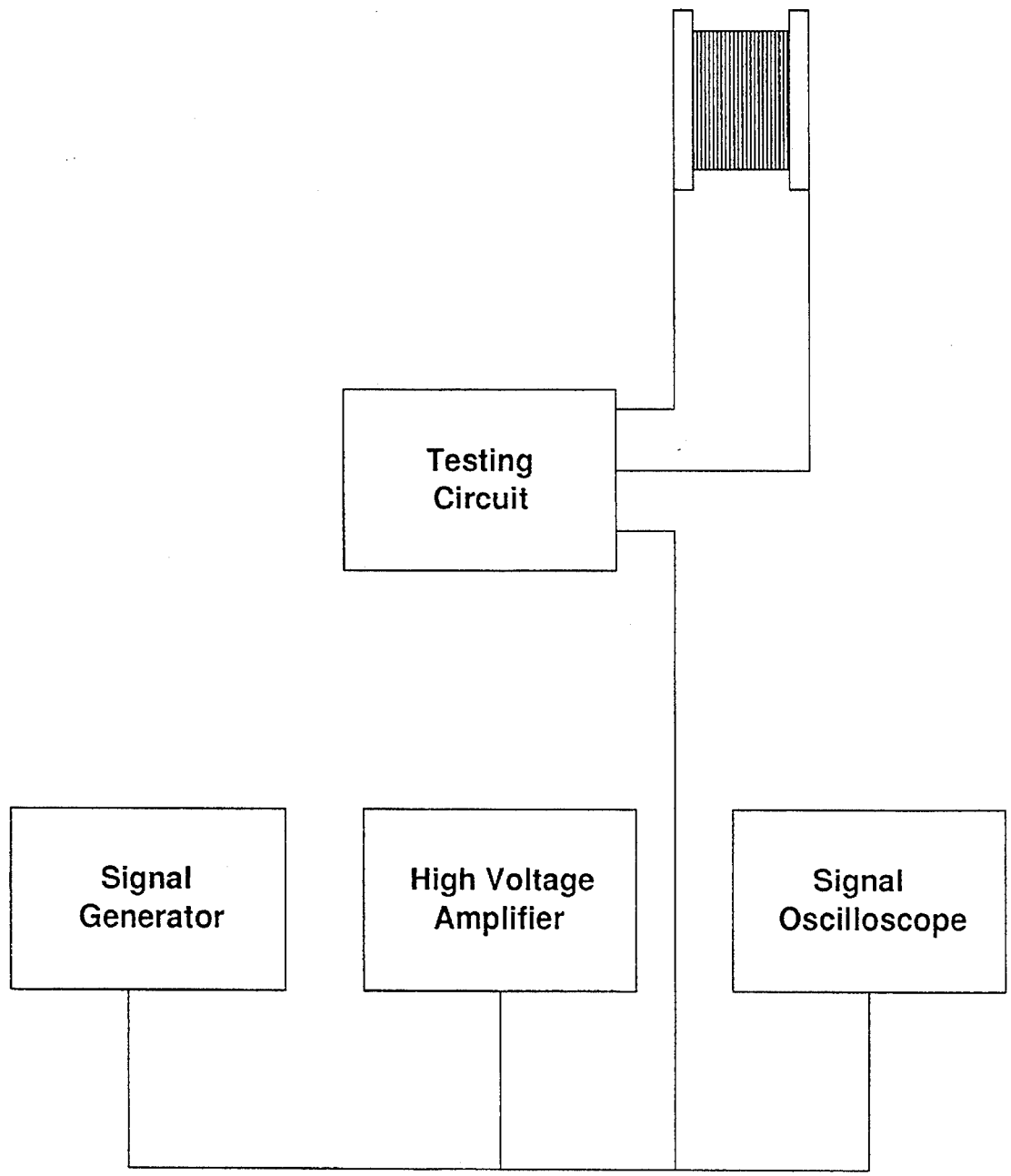
FIG. 3 is block diagram for testing the spontaneous polarization of a liquid crystalline polymer.

To verify the electro-optical properties of the materials disclosed in the present invention, we use a Leitz Laborlux 12 POL polarizing microscope to observe the change of the change of the liquid crystalline phase. A Mettier FP82 Hot Stage is used to control the rates of temperature ascending and descending for the test samples. An electrical field reversal method is also conducted at 95° C. to observe any ferroelectricity. Spontaneous polarization of the test samples are measured using a procedure disclosed in the block diagram shown in FIG. 3.

The scope of the present invention also encompasses the method of preparing the mixture composition containing nematic ester-type liquid crystal and side-chain polymethylsiloxane polymer. The mixture composition comprises 15 to 55 wt% of side-chain polymethylsiloxane polymer, and 45 to 85 wt% of nematic ester liquid crystal. Preferably, the mixture composition comprises 25 to 45 wt% of side-chain polymethylsiloxane polymer, and 55 to 75 wt% of nematic ester liquid crystal. More preferably, the mixture composition comprises 40 wt% of side-chain polymethylsiloxane polymer, and 60 wt% of nematic ester liquid crystal. In preparing the mixture composition of the present invention, the individual components thereof are precisely measured and mixture is then placed at a temperature above the clear temperature of the nematic ester liquid crystal heated for more than 10 minutes until they are completely mixed. The mixture is then cooled down to room temperature to obtain a homogeneous composition. Thereafter, the mixture composition is coated onto a conductive indium tin oxide (ITO) glass substrate laminated with polyimide to form a composite film. This comprises an electro-optical test specimen.

Figure 4:
FIG. 4 shows the polarizing microscopic picture of a composite film containing the mixture composition of the present invention; temperature is 125° C. and the magnification factor is 400.

The electro-optical test specimen is place at a temperature of 95° C. to measure the spontaneous potential using the field reversal method as show in Table 1. In another test procedure, the electro-optical test specimen is heated until it reaches an isotropic phase. After an external electrical field is established, the temperature of the test specimen is cooled down to room temperature. When the specimen exhibits a scattered light with a milky white appearance, as shown in FIG. 4, it indicates a writable status. To measure the transparency of element, we used a laser beam as the light source. A multiple frequency spectrometer (MCPA - 100) was used in the test. The results are shown in table 2.

Figure 5:
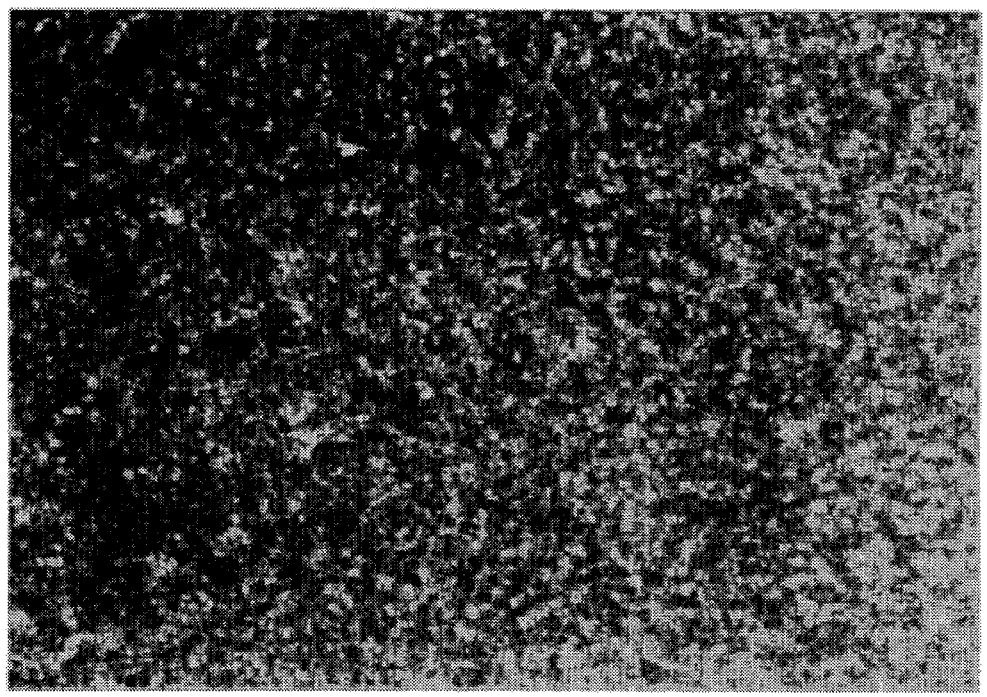
FIG. 5 shows the polarizing microscopic picture of a composite film containing the mixture composition of the present invention; temperature is 110° C. and the magnification factor is 600.

In yet another test procedure, the electrical field was removed. A stable YAG laser beam with a frequency between 470 nm to 530 nm was used to heat the sample until the structure changed to isotropic phase. Then the test sample was cooled down to room temperature. The heated portions of the test sample was changed to a transparent smectic A phase, as in FIG. 5. This indicates that the optical data have been written and recorded, and thus the test sample becomes optically readable. The recorded data are erasable using an external electrical field in conjunction with a laser beam, which supplies heating means. By using an external electrical field in conjunction with the laser heating, the test sample is transformed into an isotropic phase, which, after being cooled to room temperature, will return to its original opaque and optically-writable status. The second step erased the recorded data. After the test sample acquires either the optically-writable or optically readable status, it will maintain the same status as long as the surrounding temperature is maintained below the glass transition temperature of the side-chain liquid crystalline. Therefore, the material disclosed in the present invention can be used as a highly reliable erasable electro-optical material. In the procedure described above, the recorded data is erased by converting the recording medium to an opaque state. Data are written to the recording medium by converting the recording medium into a transparent state.

Figure 6:
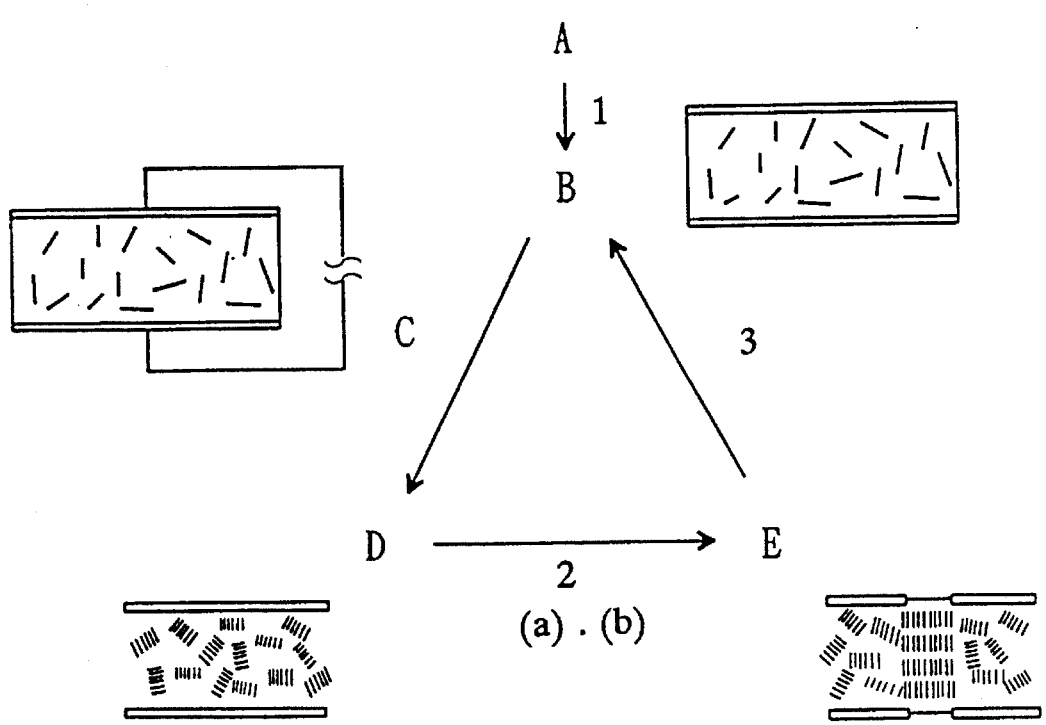
FIG. 6 is a schematic diagram showing an erasable optical memory element using the composition of the present invention; in which (A) is the optical element to be tested, (B) is an isotropic phase, (C) is an externally applied electrical field, (D) is a random state, (E) is an aligned state (i.e, readable/erasable state), (1) indicating application of heat, (2) indicating the process of manufacturing, (a) indicating laser positioning, (b) indicating application of cooling, (3) indicating laser beam heating.

The above stated procedure can be reversed so that the recording medium will become opaque when data are recorded, and transparent when data are erased. The two procedures to provide reversible read-and-write and erase functions are illustrated in FIG. 6. When the mixture composition contains 10 wt% of side-chain polymethylsiloxane and 90% is nematic ester liquid crystal, it exhibits a droplet structure when inspected under a microscope and will not be suitable for data storage purposes.

FIG. 6 is a schematic diagram illustrating the procedures of using the composite film of the present invention to provide an erasable read-and-write recording medium. The application of the multilayered film as an erasable optical signal storage device. A is the testing sample; B indicates an isotropic state; C indicates an externally applied electrical field; D indicates an randomly distributed state (writable); E indicates a readable and erasable state. Numerals (1) indicate heating; (2) indicates manufacturing; and (3) indicates using laser heating to erase recorded date. Additionally, (a) indicating positioning by laser beam; (b) indicates cooling;

In the Tables, Table 1 shows the spontaneous polarization of the liquid crystal using the field reversal method. Table 2 shows the transparency of the test specimen.

In summary, the mixture composition disclosed in the present invention provides an erasable read-and-write medium, on which data can be stored using laser heating in conjunction with an externally applied electrical field. Any other method that can reversibly convert the recording medium of the present invention between an opaque scatted state and a transparent state can also be used to facilitate the reading, writing and erasing functions. The mixture composition of the present invention contains 45 to 85 wt% of a nematic ester liquid crystal and 15 to 55 wt% of a side-chain polymethylsiloxane polymer. The mixture composition of the present invention exhibits two stable states: an optically readable state and an optically writable state, and the two states are exchangeable thereby allowing a recording medium made from the mixture composition of the present invention an optically erasable recording medium. The recording medium contains the mixture composition of the present invention can be repeatedly used to provide read and write functions.

The present invention will now be described more specifically with reference to the following examples. It is to be noted that the following descriptions of examples including preferred embodiments of this invention are presented herein for purpose of illustration and description; it is not intended to be exhaustive or to limit the invention to the precise form disclosed.

Example 1 Measurement of Electro-optical property of side-chain liquid crystalline polymers:

Poly-4'-( 3S,2S')-3-methyl-2-chlorovaleroxy-biphenyl-4-(7-oxyoctyl-methyl-siloxane), hereinafter "Compound A" was accurately weighed. Using the method mentioned above, which is well-known in the art, a thin film was prepared which was subsequently tested for the surface structure thereof.

A LeitzLabor lux 12 POL Polarizating Microscope was used to observe the liquid crystalline phases of the test sample. During the testing, a Mettier FP82 Hot Stage was used to control the ascending and descending rates of the test temperature.

In addition, Compound A was sandwiched between two electrically conductive glass substrates to observe the spontaneous polarization of the liquid crystalline structure at 95° C. using the field reversal method.

Example 2 Preparation of liquid crystal/side-chain liquid crystalline polymer composition, and electro-optical elements:

0.025 g compound A and 0,075 g ZLI 2140 (hereinafter called "Compound B", which is a nematic ester liquid crystal made by E. Merck) were precisely measured. The two components were uniformly mixed at a temperature above the clear point temperature of Compound B in a bottle and heated for 10 minutes. The mixture was cooled down to room temperature to obtain a homogeneous mixture.

An electro-optical element was then prepared from the above mixture and tested using the same procedure as described in Example 1.

Example 3 Using a laser beam to record optical signals on the liquid crystal/side-chain liquid crystal polymer composition:

The electro-optical element prepared in Example 2 was heated until it reached an isotropic phase. The sample was then cooled down to room temperature without an externally applied electric field. In the absence of an external electrical field, the sample was again heated using an Ar laser beam. During the second heating step, the composition was converted again to an isotropic phase. Then the test sample was cooled down to room temperature. The transparency of the test sample was measured using a multiple frequency spectrometer (MCPA-100) using a laser beam as the light source.

Example 4 Using an electric field to erase optical data recorded on the liquid crystal/side-chain liquid crystal polymer composition:

In Example 4, the optical data that had been recorded on the test sample were removed using a procedure as described in Example 3, except that an electrical field at 120 V and 32 Hz was applied.

Example 5 Preparing liquid crystal/side-chain liquid crystalline polymer composition, and electro-optical element:

An electro-optical element was prepared with a procedure similar to Example 2, except that the mixture composition contained precisely 0.045 g of Compound A and 0.055 g of ZLI 2140 (which is a Compound B). An electro-optical element was then prepared in accordance with the procedure described in Example 1.

Example 6 Using laser beam to record optical signals on the liquid crystal/side-chain liquid crystal polymer composition of Example 5:

Using the procedure as described in Example 3, the electro-optical element prepared in Example 5 was tested for its fixed point transparency in the absence of an external electrical field.

Example 7 Using an electric field to erase optical data recorded on the liquid crystal/side-chain liquid crystal polymer composition:

Using the procedure as described in Example 4, the electro-optical element prepared in Example 5 was tested for its fixed point transparency in the presence of an external electrical field.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

TABLE 1

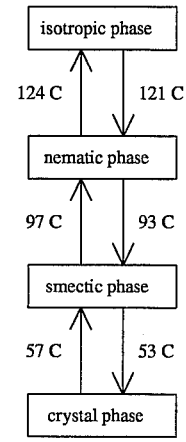

TABLE 2

| CASE | Relative Transparency | Electric Field Polarization |
| --- | --- | --- |
| 3 | 27% | − |
| 4 | 75% | + |
| 6 | 18% | − |
| 7 | 85% | + |

What is claimed is:

1. A liquid crystal/side chain liquid crystal polymer composition for use as an optical recording medium comprising:

(1) 45 to 85 wt % of a nematic ester liquid crystal; and
(2) 15 to 55 wt % of a side-chain polymethylsiloxane liquid crystal polymer having a molecular weight between 4,000 to 10,000, wherein said side-chain polymethylsiloxane liquid crystal polymer is represented by the following formula:

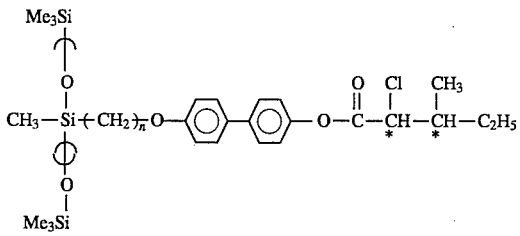

where n and m are integers less than 30 and 120, respectively, and said n and m are selected such that the molecular weight of said side-chain polymethylsiloxane liquid crystal polymer is between 4,000 and 10,000.

2. The liquid crystal/side chain liquid crystal polymer composition as claimed in claim 1 wherein said terminal chiral group is an alkyl group having 6 to 11 carbons.

3. The liquid crystal/side chain liquid crystal polymer composition as claimed in claim 1 wherein said side-chain polymethylsiloxane liquid crystal polymer has a glass transition temperature between −10° and 50° C. and exhibits liquid crystalline characteristics at temperatures between 30° and 140° C.

4. The liquid crystal/side chain liquid crystal polymer composition as claimed in claim 1 wherein said polymethylsiloxane liquid crystal exhibits nematic and/or smectic liquid crystalline phases at temperatures between 30° and 140° C.

5. The liquid crystal/side chain liquid crystal polymer composition as claimed in claim 1 which contains 25 to 45 wt% of said side chain polymethylsiloxane liquid crystal polymer.

6. The liquid crystal/side chain liquid crystal polymer composition as claimed in claim I which contains 40 wt% of said side chain polymethylsiloxane liquid crystal polymer.

7. The liquid crystal/side chain liquid crystal polymer composition as claimed in claim 1 wherein said liquid crystal exhibits nematic and/or smectic liquid crystalline phases at temperatures between 50° and 90° C.

8. The liquid crystal/side chain liquid crystal polymer composition as claimed in claim 1 wherein said liquid crystal exhibits nematic and/or smectic liquid crystalline phases at temperatures between 60° and 75° C.

9. The liquid crystal/side chain liquid crystal polymer composition as claimed in claim 1 which contains 55 to 75 wt% of said nematic ester liquid crystal.

10. The liquid crystal/side chain liquid crystal polymer composition as claimed in claim 1 which contains 60 wt% of said nematic ester liquid crystal.

11. The liquid crystal/side chain liquid crystal polymer composition as claimed in claim 1 which is used in the manufacturing of an erasable optically readable and writable recording medium.

12. A method for eraserably recording optical data in a recording medium prepared from a liquid crystal/side chain liquid crystal polymer composition as described in claim 1, said method comprising the steps of:

(a) using a laser heating means to write data into said recording medium; and (b) using an externally applied electrical field to erase data recorded in said recording medium.

13. The method as claimed in claim 12 wherein said laser heating means has an output power of 5 mW/J.

14. The method as claimed in claim 12 wherein said laser heating means has a frequency between 470 nm and 530 nm.

15. The method as claimed in claim 12 wherein said externally applied electrical field is an alternating current having a voltage of between 50 and 200 volt and a frequency of between and 60 Hz.

16. The method as claimed in claim 12 wherein said recording medium has a thickness of between 6 and 12.5 microns.

17. The method as claimed in claim 12 wherein said recording medium exhibits a nematic liquid crystal phase at temperatures between 20° and 125° C.

* * * * *